United States Patent
Dong (10) Patent No.: US 8,343,645 B2
(45) Date of Patent: Jan. 1, 2013

(54) BATTERY COVER ASSEMBLY FOR PORTABLE ELECTRONIC DEVICE

(75) Inventor: Shui-Jin Dong, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 366 days.

(21) Appl. No.: 12/826,815

(22) Filed: Jun. 30, 2010

(65) Prior Publication Data

US 2011/0159335 A1    Jun. 30, 2011

(30) Foreign Application Priority Data

Dec. 31, 2009   (CN) .......................... 2009 1 0312851

(51) Int. Cl.
*H01M 2/10* (2006.01)

(52) U.S. Cl. .............................. 429/97; 429/96; 429/100
(58) Field of Classification Search ............ 429/96–100, 429/121–347; 455/575.1–575.9; 379/428.01, 379/433.11; 361/600, 679, 700; 320/107–115; 324/156; D13/103, 108
See application file for complete search history.

(56) References Cited

U.S. PATENT DOCUMENTS

2008/0096617 A1 *  4/2008  Hwang et al. .............. 455/575.1

* cited by examiner

*Primary Examiner* — Basia Ridley
*Assistant Examiner* — James Lee
(74) *Attorney, Agent, or Firm* — Altis Law Group, Inc.

(57) ABSTRACT

A battery cover assembly for a portable electronic device includes a base body, a battery cover, and an operating member. The base body forms two hooks. The operating member is rotatably attached to the battery cover. The operating member includes two arms latching with the hooks. When the operating member is rotated, the arms are moved to separate from the hooks to allow the battery cover to releasably latch to the base body.

15 Claims, 9 Drawing Sheets

BATTERY COVER ASSEMBLY FOR PORTABLE ELECTRONIC DEVICE

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), mobile phones, and so on. Conventional batteries are removably received in the electronic device, and battery covers are designed to connect to housings of the electronic devices to cover and protect the batteries. Batteries are replaced by opening the battery covers when, for example, the batteries are damaged and/or dead (i.e. no longer rechargeable).

Although battery cover assemblies may be simple, engagement between the battery cover and the housing of the mobile phone can be too firm to be easily undone.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION

Figure 1:
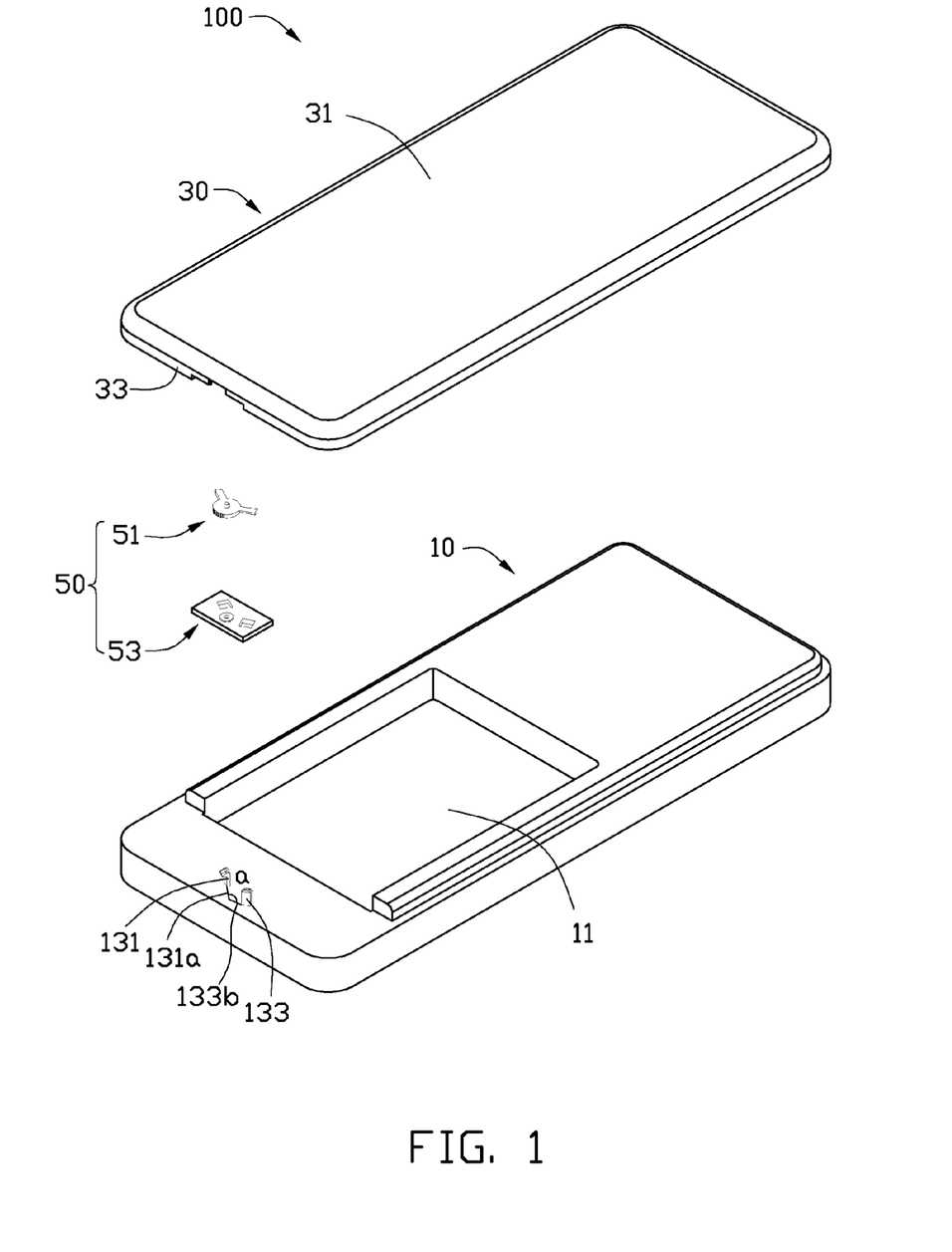
FIG. 1 is an exploded, isometric view of a portable electronic device employing a battery cover assembly in accordance with an exemplary embodiment.

FIG. 1 shows a portable electronic device 100, such as a mobile phone, having a battery cover assembly. The mobile phone 100 is an exemplary application, for the purposes of describing details of an exemplary embodiment of a battery cover assembly. The battery cover assembly includes a base body 10, a battery cover 30, and a latching module 50. The latching module 50 releasably latches the battery cover 30 to the base body 10.

The base body 10 defines a cavity 11 for receiving a battery (not shown). Two elastic hooks 131,133 are formed on one end of the base body 10. Two imaginary intersected lines 131a, 133a, each of which are coplanar with a surface of a respective hook, form an angle of a degrees. In this exemplary embodiment, the angle is about 120 degrees. Hook portion, adjacent the distal ends of the hooks 131,133 face opposite directions.

Figure 2:
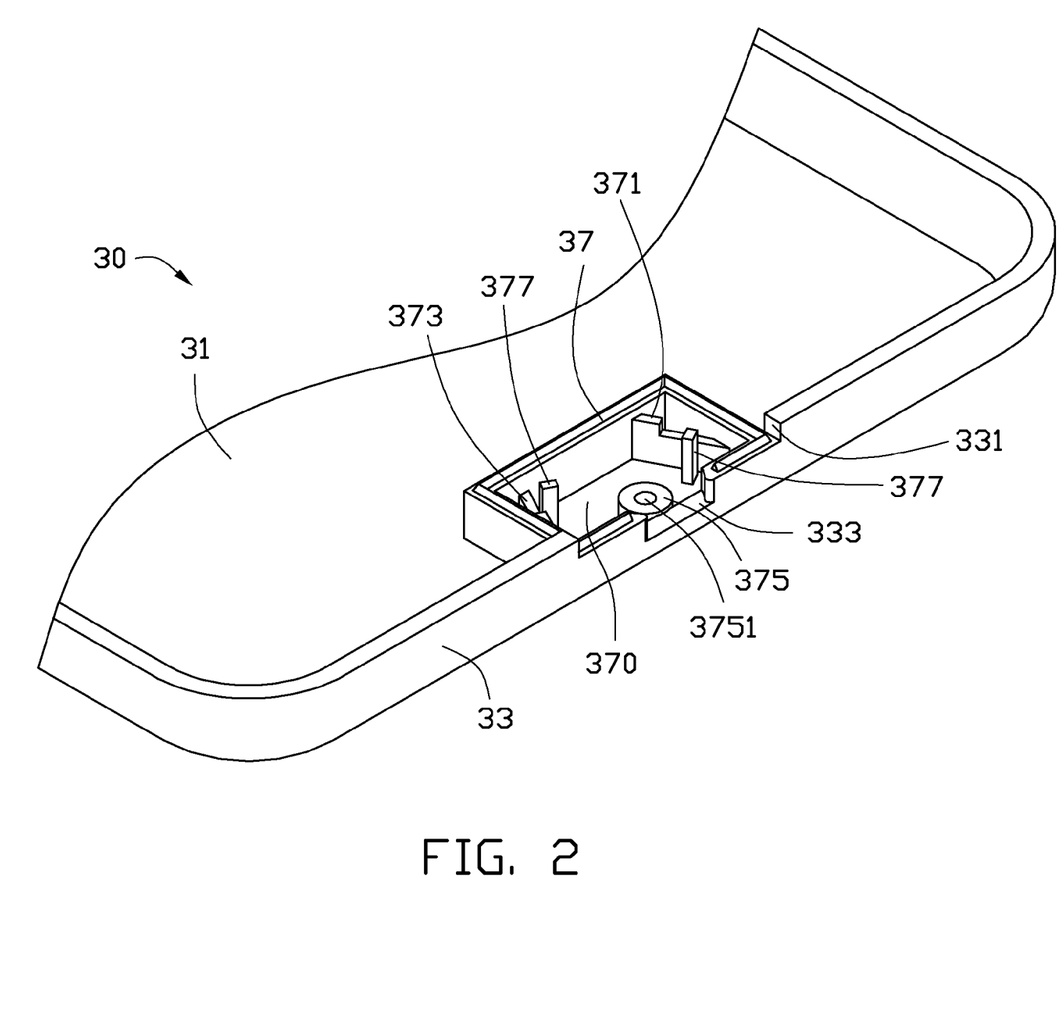
FIG. 2 is an enlarged, isometric view of one part of the battery cover in FIG. 1, but shown from another aspect.

Referring to FIG. 2, the battery cover 30 has a shape corresponding to the base body 10 configured to be attached to the base body 10. The battery cover 30 includes a back plate 31 and a sidewall 33 extending from one edge of the back plate 31. The sidewall 33 defines a first opening 331 and a second opening 333. A frame 37 extends from the back plate 31, and intersects with the sidewall 33. A receiving space 370 is defined between the frame 37 and the sidewall 33. A first stepped plate 371 and a second stepped plate 373 protrude from the back plate 31 in the receiving space 370. The first stepped plate 371 and the second stepped plate 373 are respectively arranged at two corners of the frame 37. The higher portions of the first stepped plate 371 and the second stepped plate 373 are oriented in generally opposite directions. Resisting beams 377 are respectively disposed at one side of the first stepped plate 371 and the second stepped 373. The resisting beams 377 are made of elastic material. A column 375 is formed in the receiving space 370, and is aligned with the first opening 331 and the second opening 333. A first hole 3751 is defined in the column 375.

Figure 3:
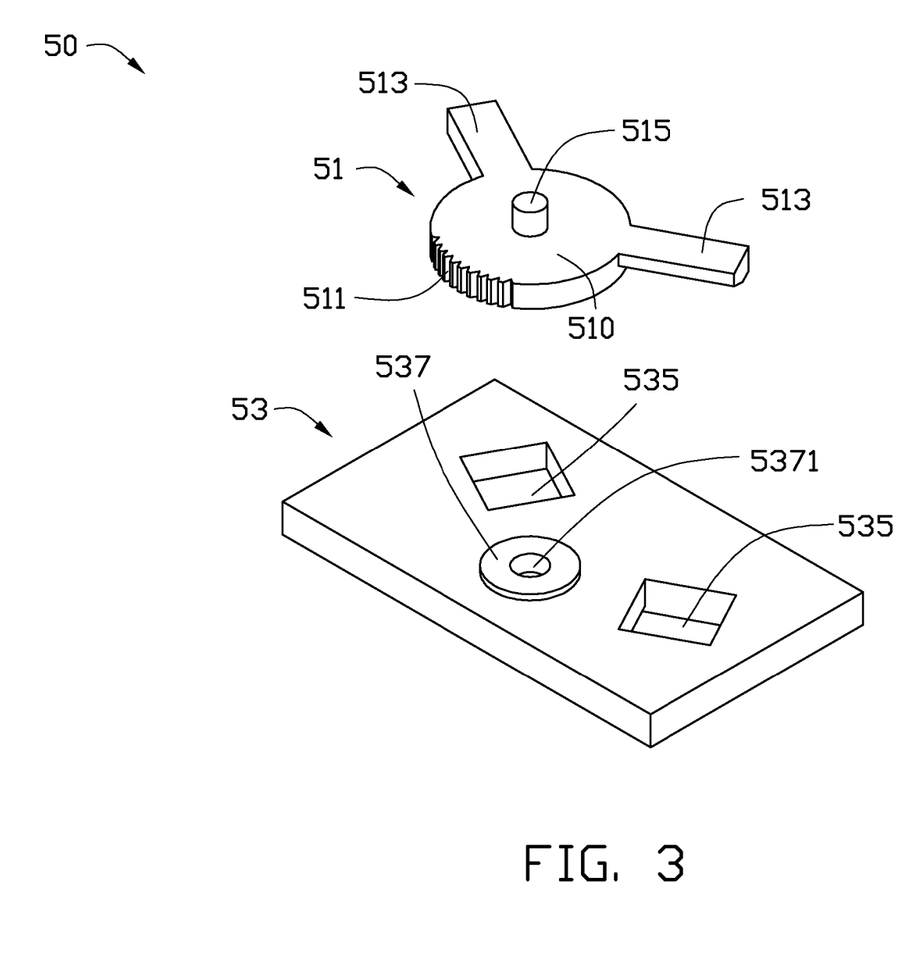
FIG. 3 is an enlarged view of the latching module in FIG. 1.

Referring to FIG. 3, the latching module 50 includes an operating member 51 and a covering plate 53. The operating member 51 includes a disk body 510, two arms 513 and a shaft 515. The two arms 513 radially extend from a portion of the circumferential surface of the disk body 510, and are angled apart about 120 degrees (i.e., corresponding to angle alpha). The two arms 513 respectively abut against the higher portions of the first stepped plate 371 and the second stepped plate 373. The two elastic hooks 131,133 lock to the arms 513. The shaft 515 is fixed to a center of the disk body 510, and ends of the shaft 515 respectively extend from two sides (surfaces) of the disk body 510. An end of the shaft 515 is engagable in the first hole 3751, and the operating member 51 may rotate around the shaft 515. A plurality of serrated ribs 511 are formed on another side of the circumferential surface. When the operating member 51 is received in the receiving space 370, the ribs 511 are exposed from the second opening 333.

The covering plate 53 is configured for covering the frame 37 to prevent the operating member 51 from separating from the receiving space 370. A length of the covering plate 53 is substantially equal to that of the first opening 331. The covering plate 53 defines two notches 535 substantially arranged about 120 degrees, again corresponding to the angle alpha. The notches 535 allow the hooks 131, 133 to extend through. A block 537 is formed at one side of the covering plate 53. A second hole 5371 is defined in the block 537 for receiving another end of the shaft 515.

Figure 4:
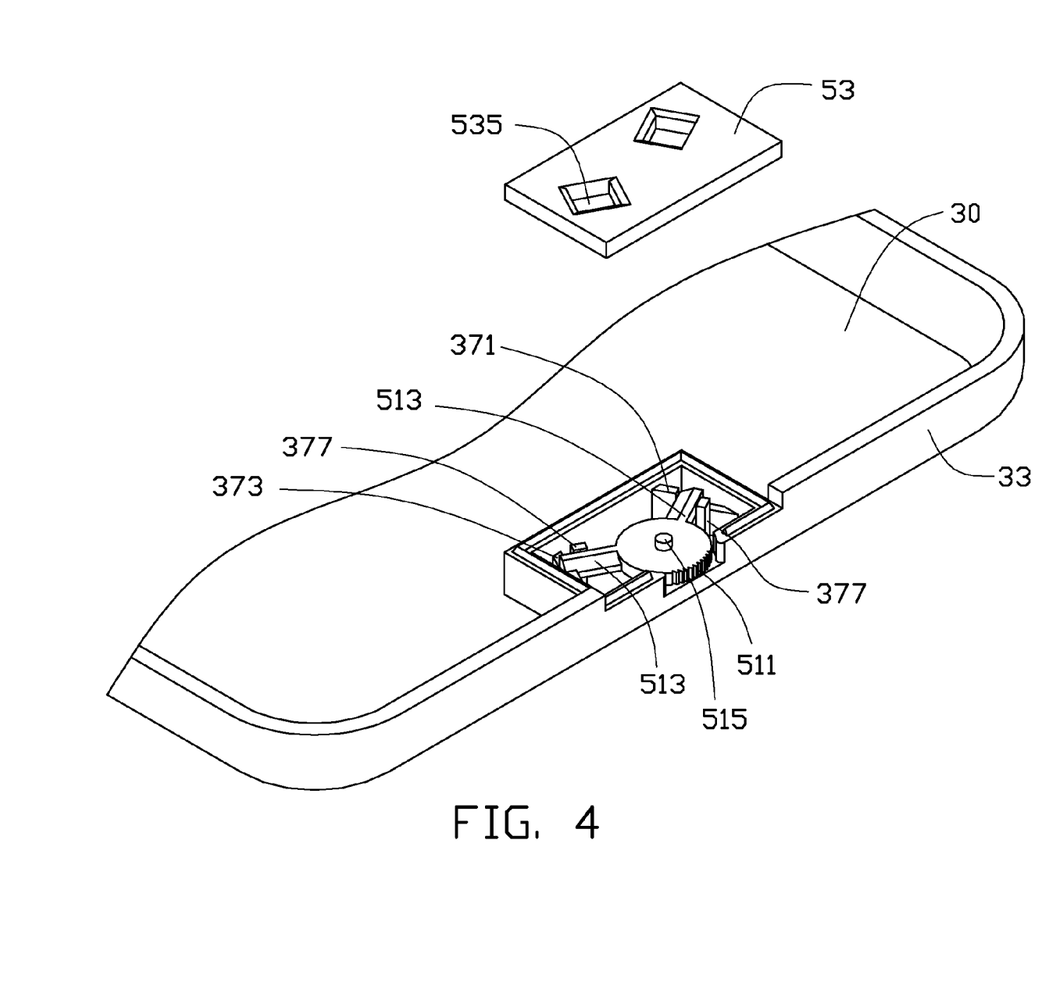
FIG. 4 is a partially assembled view showing the operating member attached to the battery cover.
Figure 5:
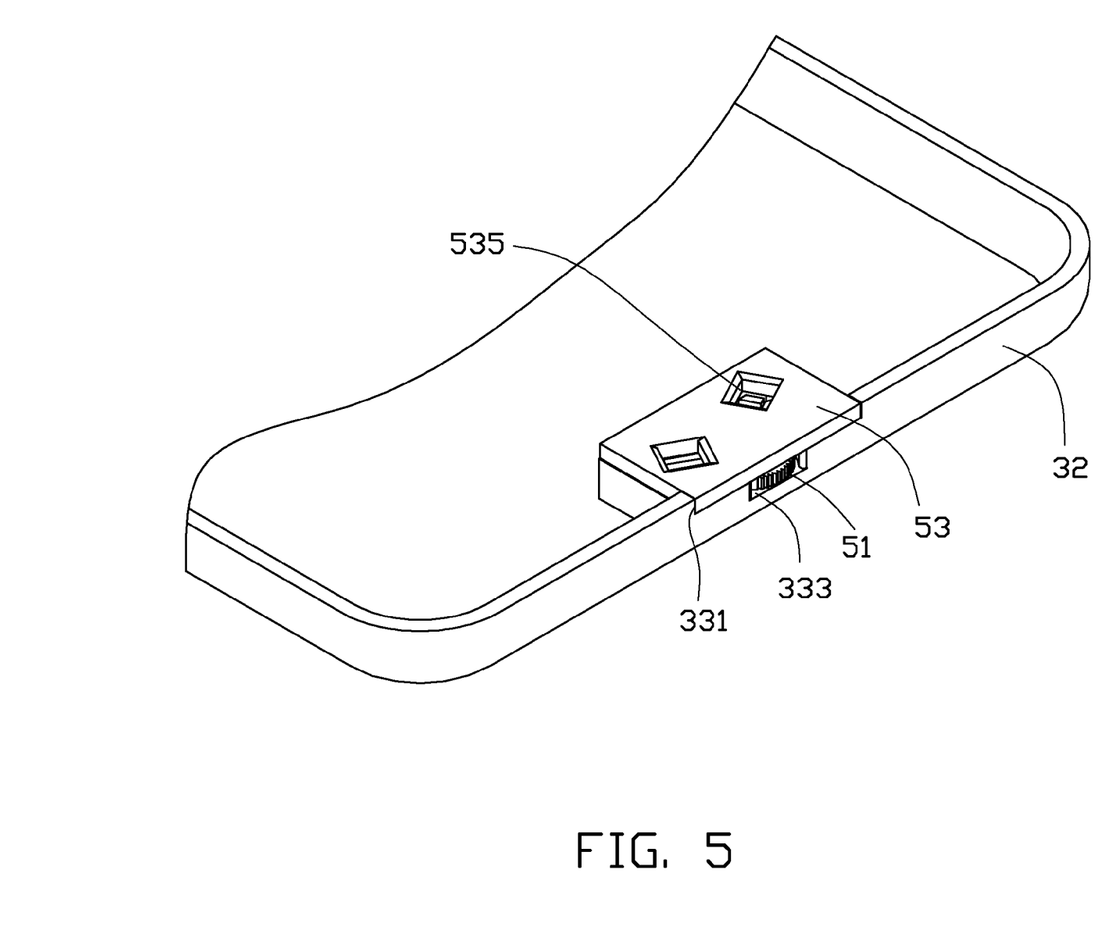
FIG. 5 is a partially assembled view showing the latching module attached to the battery cover.

During assembly of the battery cover assembly, referring to FIGS. 4 and 5, the latching module 50 is assembled to the frame 37 of the battery cover 30. One end of the shaft 515 of the operating member 51 is received in the first hole 3751, and the two arms 513 are positioned on the first stepped plate 371 and the second stepped plate 373. Then, the covering plate 53 is placed on the frame 37 to cover the operating member 51, and is fixed by, e.g. ultrasonic welding. The other end of the shaft 515 is received in the second hole 5371. One side of the covering plate 53 is received in the first opening 331.

Figure 6:
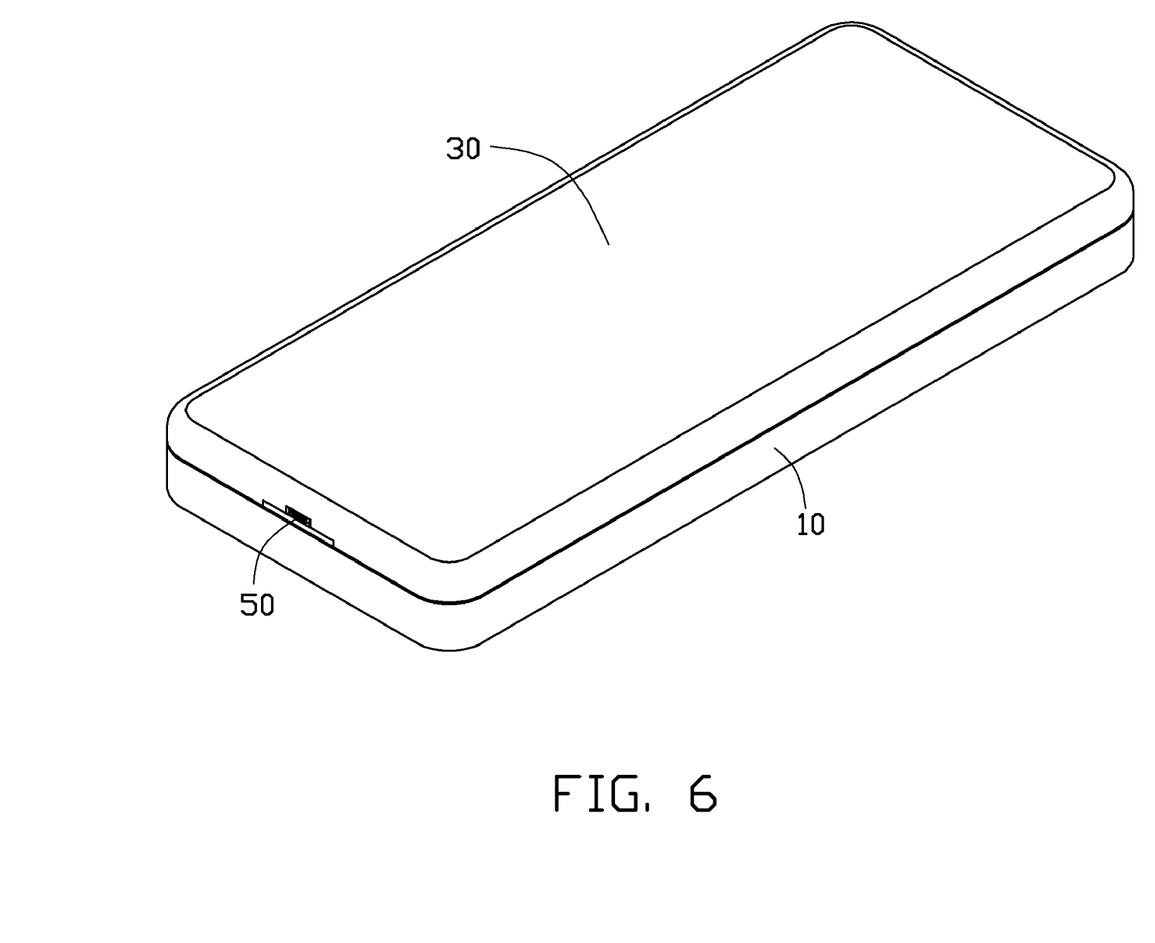
FIG. 6 is an isometric view of a portable electronic device.
Figure 7:
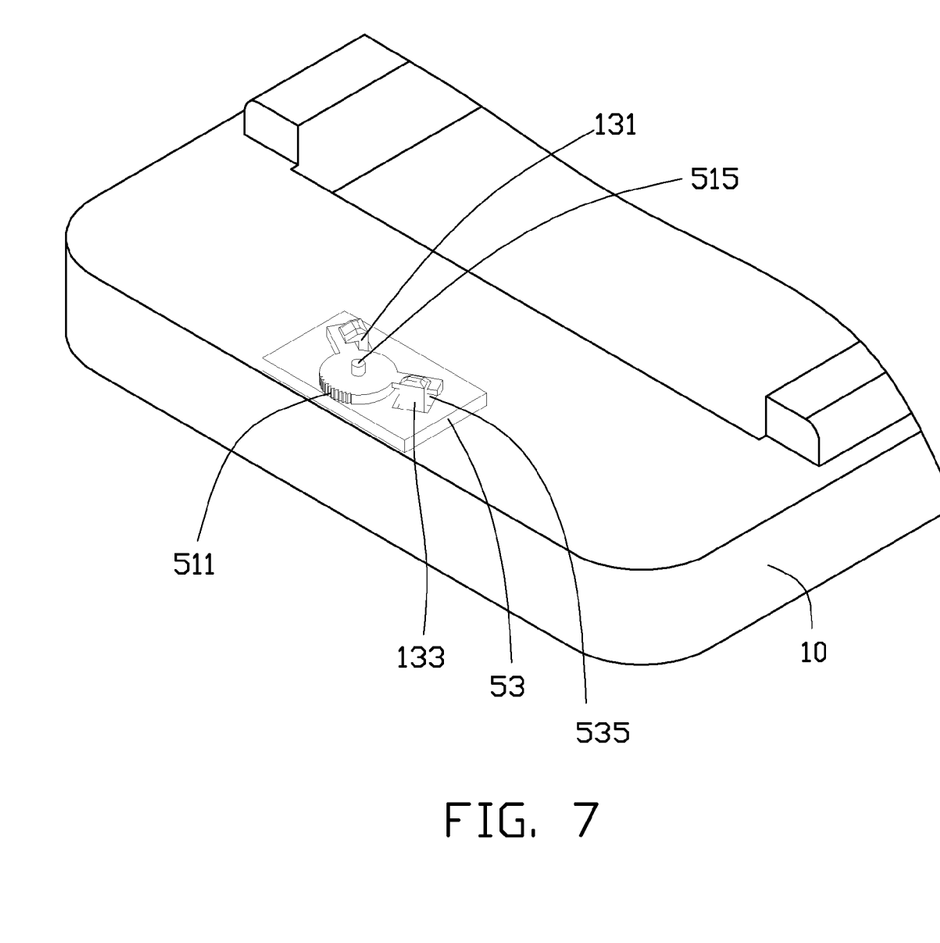
FIG. 7 is a schematic view showing the latching module attached to the base body in a locked state.

Referring to FIGS. 6 and 7, the battery cover 30 is pressed downward, and forces the hooks 131,133 to extend into the notches 535. The hooks 131,133 latch with the arms 513. Thus, the battery cover 30 is assembled in the base body 10. The ribs 511 are exposed from the second opening 333 of the battery cover 30.

Figure 8:
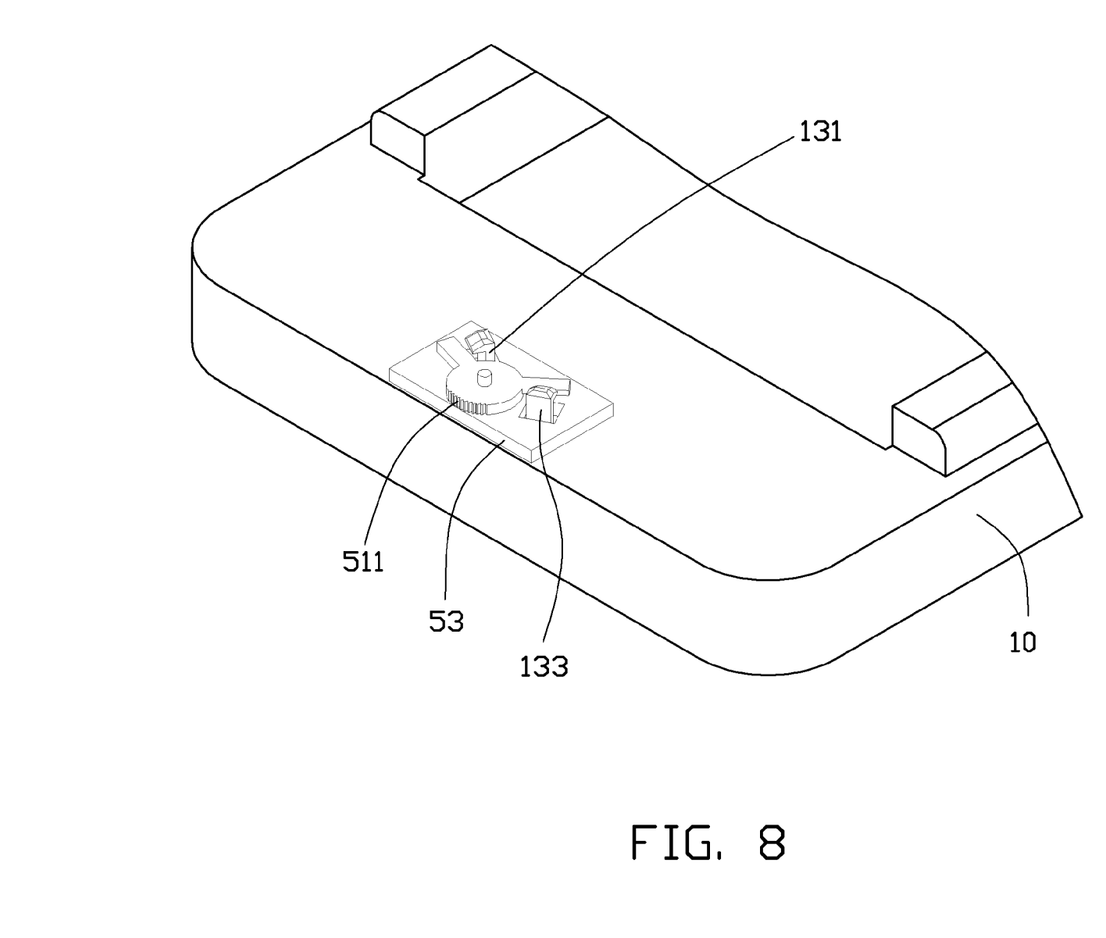
FIG. 8 is a schematic view showing the latching module attached to the base body in an unlocked state.
Figure 9:
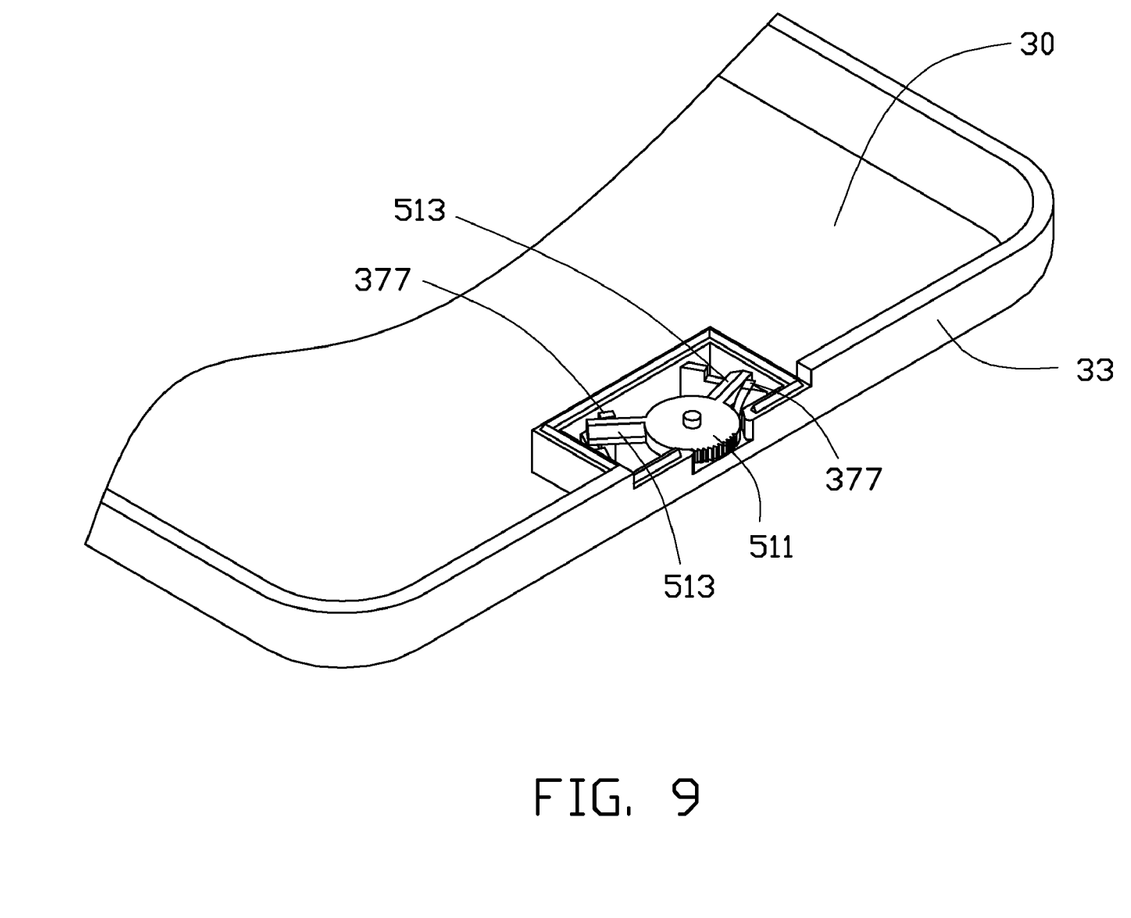
FIG. 9 is a schematic view showing the latching module attached to the battery cover in an unlocked state.

Referring to FIGS. 8 and 9, to open the battery cover 30, the ribs 511 are used to rotate the operating member 51. The resisting beams 377 are deformed by the moving arms 513 to allow further movement of the arms 513 to a position where the hooks 131,133 separate from the arms 513. The battery cover 30 can then be removed. The elastic resisting beams 377 then rebound, causing the operating member 51 to return to its normal position.

As described above, the exemplary embodiment provides a battery cover assembly for portable electronic devices, such as mobile phones. The battery cover of the battery cover assembly can be easily opened and more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly for a portable electronic device, the battery cover assembly comprising:
   a base body forming two hooks;
   a battery cover;
   an operating member rotatably attached to the battery cover, the operating member including two arms for latching with the hooks, a disk body and a shaft, the arms being radially formed on one portion of a circumferential surface of the disk body, the shaft being fixed to a center of the disk body, and ends of the shaft respectively extending from opposite surfaces of the disk body; and
   wherein when the operating member is rotated, the arms are moved to separate from the hooks to allow the battery cover to releasably latch to the base body.

2. The battery cover assembly as claimed in claim 1, wherein a plurality of serrated ribs are formed on another portion of the circumferential surface.

3. The battery cover assembly as claimed in claim 1, wherein a frame is positioned on the battery cover, the operating member is rotatably received in the frame.

4. The battery cover assembly as claimed in claim 3, wherein a first stepped plate and a second stepped plate are respectively arranged to two corners of the frame to support the arms.

5. The battery cover assembly as claimed in claim 4, wherein an elastic resisting beam is respectively disposed at one side of each first stepped plate and the second stepped plate.

6. The battery cover assembly as claimed in claim 5, wherein a column is formed in the frame, and a first hole is defined in the column, and one end of the shaft is rotatably received in the first hole.

7. The battery cover assembly as claimed in claim 1, further comprising a covering plate, a frame is positioned on the battery cover, the operating member is rotatably received in the frame, and the covering plate covers the frame.

8. The battery cover assembly as claimed in claim 7, wherein the covering plate defines two notches substantially arranged about 120 degrees apart, the notches allowing the hooks to extend therethrough.

9. The battery cover assembly as claimed in claim 8, wherein a column is formed in the battery cover, and a first hole is defined in the column for rotatably receiving one end of the shaft, a block is formed at one side of the covering plate, a second hole is defined in the block for rotatably receiving another end of the shaft.

10. A portable electronic device comprising:
    a base body forming two hooks;
    a battery cover including a frame;
    a latching module including an operating member and a covering plate, the operating member rotatably received in the frame, the covering plate covering the frame and sandwiching the operating member to the battery cover, the operating member including two arms for latching with the hooks; and
    wherein when the operating member is rotated, the arms are moved to separate from the hooks to allow the battery cover to releasably latch to the base body.

11. The portable electronic device as claimed in claim 10, wherein the frame includes a first stepped plate and a second stepped plate respectively arranged to two corners of the frame to support the arms.

12. The portable electronic device as claimed in claim 11, wherein an elastic resisting beam is respectively disposed at one side of either of the first stepped plate and the second stepped plate.

13. The portable electronic device as claimed in claim 10, wherein, the covering plate defines two notches substantially arranged about 120 degrees apart, the notches allowing the hooks to extend therethrough.

14. A portable electronic device comprising:
    a base body forming two hooks;
    a battery cover;
    a latching module including an operating member and a covering plate, the covering plate sandwiching the operating member to the battery cover, the operating member including two arms for latching with the hooks, a disk body and a shaft, the arms being radially formed on one portion of a circumferential surface of the disk body, the shaft being fixed to a center of the disk body, and ends of the shaft respectively extending from opposite surfaces of the disk body; and
    wherein when the operating member is rotated, the arms are moved to separate from the hooks to allow the battery cover to releasably latch to the base body.

15. The portable electronic device as claimed in claim 14, wherein a frame is positioned on the battery cover, the operating member is rotatably received in the frame, a first stepped plate and a second stepped plate are respectively arranged to two corners of the frame to support the arms.

* * * * *